(12) United States Patent
Terrero Diaz-Chirón et al.

(10) Patent No.: US 8,626,114 B2
(45) Date of Patent: Jan. 7, 2014

(54) METHOD FOR PROCESSING SERVICE REQUESTS IN A TELECOMMUNICATIONS SYSTEM

(75) Inventors: Maria Esther Terrero Diaz-Chirón, Madrid (ES); Nuria Esteban Vares, Aranjuez (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 936 days.

(21) Appl. No.: 12/602,817

(22) PCT Filed: Jun. 4, 2007

(86) PCT No.: PCT/EP2007/055486
§ 371 (c)(1),
(2), (4) Date: Dec. 3, 2009

(87) PCT Pub. No.: WO2008/148421
PCT Pub. Date: Dec. 11, 2008

(65) Prior Publication Data
US 2010/0178896 A1     Jul. 15, 2010

(51) Int. Cl.
*H04M 11/00*     (2006.01)
(52) U.S. Cl.
USPC ............ 455/405; 455/406; 455/407; 455/408
(58) Field of Classification Search
USPC ................... 455/405, 406, 407, 408
See application file for complete search history.

(56) References Cited

U.S. PATENT DOCUMENTS

| | | | |
|---|---|---|---|
| 6,026,303 A * | 2/2000 | Minamisawa | 455/446 |
| 2003/0084184 A1 | 5/2003 | Eggleston et al. | |
| 2004/0246965 A1 * | 12/2004 | Westman et al. | 370/392 |
| 2006/0035637 A1 * | 2/2006 | Westman | 455/435.3 |
| 2008/0186845 A1 * | 8/2008 | Maes | 370/230 |
| 2010/0325275 A1 * | 12/2010 | Van Elburg et al. | 709/225 |

* cited by examiner

*Primary Examiner* — Vladimir Magloire
*Assistant Examiner* — Edd Rianne Plata

(57) ABSTRACT

A service request (SRV) comprising a second identifier belonging to a collection of identifiers identified by a first identifier (WPSI-I) is rejected or allowed to proceed depending on whether the current usage data stored in relationship with the first identifier reaches a value established by usage limit data stored in relationship with said first identifier. Current usage data is updated according to service requests comprising a second identifier belonging to said collection and allowed to proceed. The usage limit data can state maximum number of simultaneous communications, or maximum number of second identifiers belonging to said collection, and can be dynamically updated according to traffic load conditions in an apparatus of the telecommunications system. The invention prevents overloading resources in telecommunications systems when the number of eventual users can not be foreseen.

18 Claims, 3 Drawing Sheets

METHOD FOR PROCESSING SERVICE REQUESTS IN A TELECOMMUNICATIONS SYSTEM

FIELD OF THE INVENTION

The present invention relates to method and apparatuses for processing service requests in a telecommunications system.

BACKGROUND

Users of the services provided by a telecommunications system are assigned to identifiers, which are commonly used for addressing and identification purposes. In legacy telecommunications systems a user was usually assigned to a single identifier. However, this tends to change in modern telecommunications systems, where the same user can be addressed (e.g. called) and identified (e.g. before another user when establishing a communication with him) by more than one identifier. The use of more than one identifier per user in a telecommunications system does not necessarily increase the traffic in the system; rather, it allows a telecommunications operator to deliver more personalized services, which can be adapted, e.g., according to a profile associated to each identifier.

An example of a telecommunications system providing such a feature is a Universal Mobile Telecommunications System, UMTS, comprising the—so called—Internet Protocol IP Multimedia Subsystem, IMS, e.g. as described in 3GPP Specification TS 23.228 V8.0.0 (March-2007). Chapters 4.3.3.2 ("Public User Identities") and 4.3.3.4 ("Relationship of Private and Public User Identities") in TS 23.228 disclose how a IMS user can be assigned to more than one "Public User Identity" PUB-ID as identifiers.

According to the standardized procedures, a communication can start to be established with a user by receiving in nodes of the IMS a service request for establishing a communication (e.g. a Session Initiation Protocol message "INVITE") comprising a PUB-ID assigned to said user, which is then processed according to the user profile associated to said PUB-ID.

Following with the illustrative case of IMS, a further kind of identifiers are also considered. These are the —so called— "Public Service Identities" PSIs. As disclosed in chapter 4.3.6 of the aforementioned TS 23.228, a PSI differs from a PUB-ID in that it identifies a particular service (or a particular service instance of a service) hosted e.g. by an application server, rather than a particular user. Both, PUB-IDs, as well as well as PSIs, take preferably the form of Session Initiation Protocol Uniform Resource Identifiers, SIP-URIs, or "telephony" URIs, TEL-URI. According to the standardized procedures, service requests comprising PSIs are routed in the IMS system using essentially the same routing mechanisms as service requests comprising PUB-IDs of users.

Recently, the—so called—"Wildcarded PSIs" have been also considered for use in IMS systems, which take also the same format (SIP-URI, TEL-URI) as PSIs. A Wildcarded PSI identifies a collection of (distinct) PSIs which belongs to its range. For example, a Wildcarded PSI such as "sip: chatlist!.*!@example.com", would identify PSIs such as:

sip:chatlist1@example.com
sip:chatlist2@example.com
sip:chatlist42@example.com
sip:chatlistABC@example.com
etc.

A service request comprising a distinct PSI belonging to a collection of identified by a Wildcarded PSIs is essentially processed in the IMS system as one more PSI. However, a significant advantage provided by the use of Wildcarded PSIs, is that they enable optimization of operation and maintenance procedures in a IMS system.

For example, for each and every PUB-ID or PSI, the Home Subscriber Server HSS of a IMS system has to store a set of data (called "service profile") which are needed for the processing service requests related to said PUB-ID or PSI in the IMS, such as registrations, multimedia session requests, etc. For a given PUB-ID or PSI these data can comprise, among other: the Serving Call Session Control Function S-CSCF assigned to mediate in sessions originating or terminating in the user/service identified by said PUB-ID or PSI; a set of structured information -called "Initial Filter Criteria" IFC, which establishes execution triggers that allows processing a service request comprising said PUB-ID or PSI according to predefined rules; other related (public and/or private) identifiers; etc. Furthermore, these service profile data has to be downloaded from the HSS to the corresponding S-CSCF and stored therein, so as to properly serve service requests comprising said PUB-ID or said PSI.

However, there is no need of storing and maintain such a service profile for each and every distinct PSIs that belongs to a collection identified by a particular Wildcarded PSI, as only a—say—generic service profile data is stored for a Wildcarded PSI, which is applicable to all the distinct PSIs identified by (i.e. belonging to) it. Accordingly, a HSS can perform the master storage of the service profile data of a given Wildcarded PSI, which can be then downloaded to a particular S-CSCF that will mediate in all service requests comprising any distinct PSIs belonging to the collection identified by the Wildcarded PSI.

Therefore, not only operation and maintenance procedures are simplified, but the quantity of data needed to be stored for some users of the IMS system can be significantly diminished by using Wildcarded PSIs; thereby, allowing optimize the usage of the storage resources, for example, in HSSs and S-CSCFs of the system, while providing essentially the same kind of services to users that can be assigned to, and identified by, distinct PSIs belonging to a Wildcarded PSI. As it is readily apparent, these advantageous features are equally applicable in other telecommunications systems, not necessarily comprising a IMS system, and having to deal with identifiers that belong to a particular collection identified by a given further identifier.

Wildcarded PSIs have been envisaged for use in Virtual Private Network VPN scenarios using IMS as a connectivity/services core network; wherein a particular VPN can e.g. be globally associated to a Wildcarded PSI, while each of its users can be individually assigned to distinct PSIs belonging to the collection identified by the Wildcarded PSI. In these scenarios the users of, e.g., a IP-based Private Exchange IP-PBX can get access to multimedia communication services through a IMS system, to which (distributed or centralized) premises of the IP-PBX are connected (e.g. via border gateways), as if they were individually subscribed to it.

The advantageous features provided by the use of Wildcarded PSIs promise an early adoption by telecommunications operators owning IMS systems, which could then increase their business opportunities by offering, for example, VPN services to other service providers. Accordingly, it should be desirable minimizing the impact due to implementation of Wildcarded PSIs for a telecommunications operator owning a IMS system.

SUMMARY

In one aspect, the invention relates to a method, an apparatus and computer Program for processing service requests in a telecommunications system.

According to the invention, usage limit data is stored in relationship with a first identifier identifying a collection of second identifiers that can be received in a service request. Further, usage data in relationship with the first identifier is also stored and updated according to service requests comprising a second identifier belonging to said collection and allowed to proceed. Service requests comprising a second identifier belonging to the collection identified by a first identifier are allowed to proceed, or rejected, depending on if the current usage data reaches a value established by the usage limit data.

By keeping updated usage data of second identifiers belonging to a collection identified by the first identifier, and then comparing it with the usage limit data set in relationship with the first identifier, overloading resources of a telecommunications system can be prevented when the number of eventual users of said system can not be foreseen in advance.

The usage limit related to a first identifier can advantageously be set according to a predefined usage fee agreed between the operator owning the telecommunications system and a service provider benefiting of using second identifiers belonging to the collection identified by the first identifier, which allow negotiation of fair and simplified pricing schemes between these parties and, what is a significant advantage, allowing to dispense with complex accounting functions/systems. Furthermore, a processing according to the invention allows the operator of a telecommunications system to perform a better dimensioning of the involved resources in the system, so as to fit service availability expectations, which can be settled in advance.

The solution of the invention provides a further advantage when agreeing the price of a node between a telecommunications operator and the technology provider of the node, particularly when the eventual usage rate of said node due to services related to some users is not known in advance, and when a pricing criterion relates to the usage rate of said node. Accordingly, the solution of the invention permits the settlement of a fair and trustable price between a telecommunications operator and the node provider by pre-configuring the node with a usage limit data consistent to said price.

According to one embodiment, the usage limit data states a maximum number of simultaneous communications established with service requests for establishing communications comprising a second identifier belonging to the collection identified by the first identifier, and allowed to proceed. According to another embodiment, the usage limit data states a maximum number of second identifiers belonging to said collection that have been received in service requests. The resource usage in a telecommunications system due to service requests related to certain users, which are not known in advance, can then be controlled in detail.

According to another embodiment, the usage limit data is updated according to traffic load conditions in an apparatus of the telecommunications system. This provides an advantageous flexibility for processing service requests comprising a second identifier belonging to a collection identified by a first identifier when said processing, mainly relies upon the capacity of a particular node, or upon a resource utilized by said node.

Features and embodiments of the invention described hereinbefore apply to any kind of telecommunications system having to deal with service requests comprising second identifiers belonging to a collection identified by a first identifier; thereby, allowing managing the traffic load in the system which is due to requests to/from an unpredictable number of users ascribed to said second identifiers. Further embodiments of the invention relates to their application to the particular case of an Internet Protocol Multimedia Subsystem, and to some of its nodes. In these embodiments the first identifier can be a Wildcarded Public Service Identifier, and the second identifiers are Distinct Public Service Identifiers belonging to the Wildcarded Public Service Identifier.

According to an embodiment, a Wildcarded Public Service Identifier identifies a group of users of a Private Exchange connected to said Internet Protocol Multimedia Subsystem. The service provider of the Private Exchange can then benefit of the services offered by, or through, the operator of the Internet Protocol Multimedia Subsystem and, in virtue of the features of the invention, the IMS operator can better adapt its network resources to the corresponding expected and/or agreed demand.

According to different embodiments, the usage limit data related to a Wildcarded Public Service Identifier can be stored in a Home Subscriber Server, or a Subscription Locator Function, and/or in a Serving Call Session Control Function. In the second case, part or all the usage limit data can be downloaded from a Home Subscriber Server by a Serving Call Session Control Function as a part of the service profile related to the Wildcarded Public Service Identifier.

By storing usage limit data as described herein different alternative or complementary embodiments are provided by the invention, which allow implementing the most suitable solution depending on the desired complexity degree.

In one embodiment, the usage limit data related to a Wildcarded Public Service Identifier is stored in a Home Subscriber Server, or in a Subscription Locator Function, and used therein for accepting or rejecting service requests consisting on User Location Queries comprising Distinct Public Service Identifiers belonging to the Wildcarded Public Service Identifier. The Home Subscriber Server, or the Subscription Locator Function, then accepts or rejects a query depending on whether the number of User Location Queries comprising Distinct Public Service Identifiers belonging to the Wildcarded Public Service Identifier, as updated usage data, exceeds a value stated in the usage limit data. A simplified implementation can thus be achieved, which only involves modifications in Home Subscriber Servers, or in Subscription Locator Functions.

In another alternative, or complementary, embodiment, the usage limit data related to a Wildcarded Public Service Identifier is stored in a Serving Call Session Control Function, and used therein for accepting or rejecting service requests for establishing communications which comprise Distinct Public Service Identifiers belonging to the Wildcarded Public Service Identifier. The usage limit data can be downloaded from a Home Subscriber Server as a part of the service profile related to the Wildcarded Public Service Identifier, or can be set therein by other procedures. The first alternative provides the advantage that neither new messages nor interfaces are needed in a Serving Call Session Control Function, whilst the second alternative allows an implementation which involves modifications only in Serving Call Session Control Functions.

As updated usage data, the Serving Call Session Control Function can, either or both, store data about the Distinct Public Service Identifiers belonging to said Wildcarded Public Service Identifier that have been received in service requests for establishing communications, and/or store data about the number of current communications established through it with service requests for establishing communications comprising Distinct Public Service Identifiers belonging to said Wildcarded Public Service Identifier. The Serving Call Session Control Function can then accept or reject a service request depending on whether one or both of these updated usage data exceeds a corresponding value stated in the related usage limit data.

By having a Serving Call Session Control Function modified as described herein, overloading of its signaling and/or processing capabilities can be prevented, since traffic load due to an unpredictable number of users, which are ascribed to Public Service Identifiers belonging to a Wildcarded Public Service Identifier said Serving Call Session Control Function is assigned to serve, can be limited in advance. Further, the usage limit data stored in the Serving Call Session Control Function in relationship with a Wildcarded Public Service Identifier can be dynamically modified according to current traffic load conditions; which permits a flexible adaptation for allowing/limiting some service requests related to an unpredictable number of users globally identified by a Wildcarded Public Service Identifier.

DETAILED DESCRIPTION

Exemplary embodiments of the invention shall now be described with reference to FIGS. 1 to 3.

Figure 1:
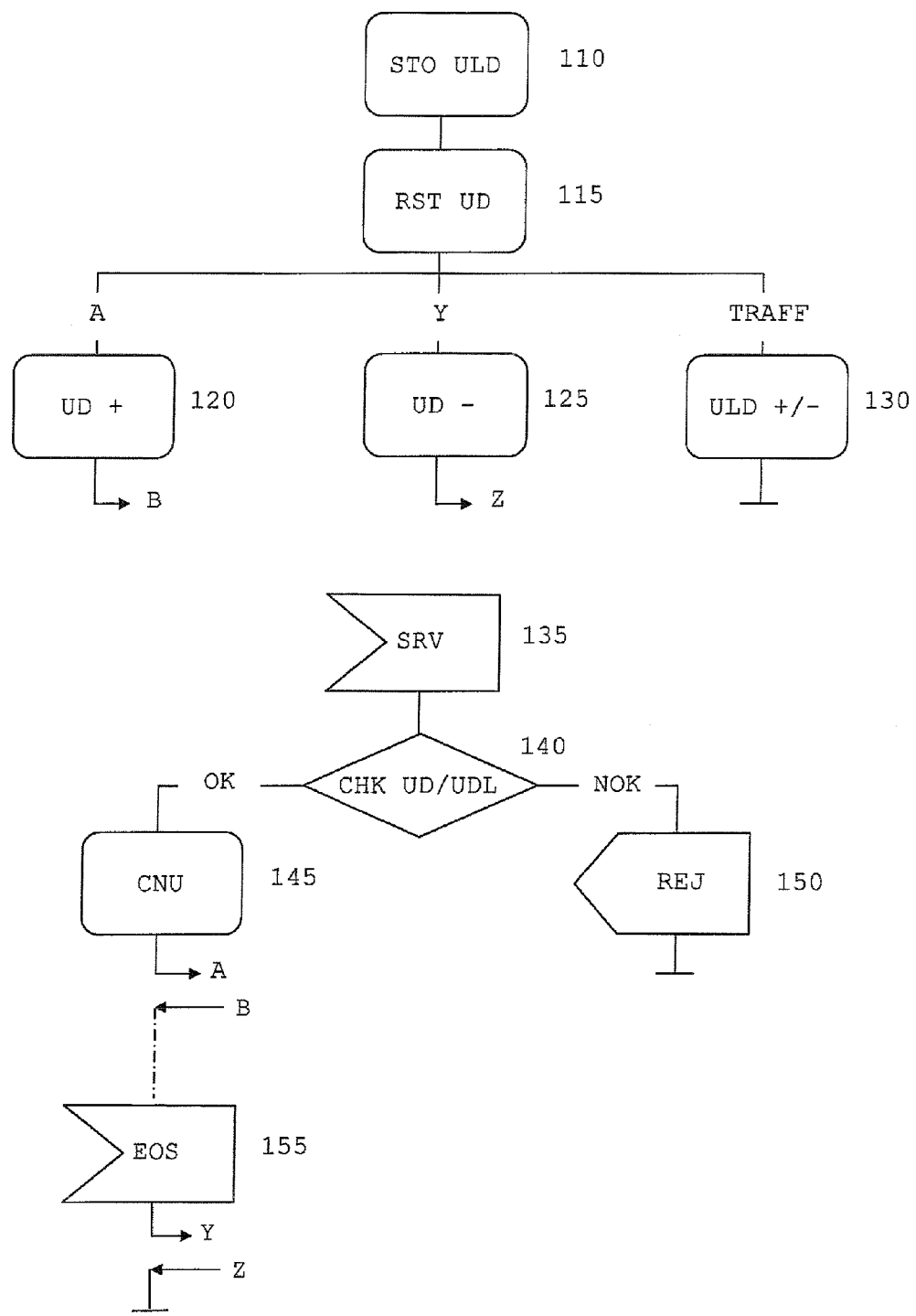
FIG. 1 shows a flowchart illustrating some steps of a method for processing service requests according to one embodiment of the invention.

The flowchart of FIG. 1 illustrates some steps of a method for processing in a telecommunications system service requests comprising (second) identifiers belonging to a collection of identifiers identified by a given (first) identifier. The steps illustrated in FIG. 1 can be performed by one node of the system, or by more than one node, as will be later described.

Preferably, before service requests are received comprising identifiers matching a collection identified by a first identifier, a node in the system stores usage limit data (ULD) in relationship with the first identifier. This is illustrated in step 110, and can be accomplished by operation and maintenance procedures, or as a result of communication procedures between nodes in the telecommunications system.

The usage limit data can be initially set according to various criteria. For example, if there is a service provider providing a VPN service to a plurality of users connected directly, or indirectly (e.g. via a PBX) to the system, wherein these users are individually identified by identifiers belonging to the first identifier, the usage limit data can be set according to a predefined fee agreed between the operator of the telecommunications system and the service provider, which can relate to the quantity and/or quality of services to be provided. The service provider can then agree a simplified pricing scheme with the operator, which can be in accordance with the quantity and/or quality of services it will offer to its customers. An advantage for operator of the telecommunications system is that overloading of system resources, for example, in terms of number of nodes, their respective capability, capacity of the used interconnection networks, etc; can be prevented by knowing in advance the usage limit data configured in the system concerning a plurality of users whose individual identifiers belong to one or more first identifiers, and adapting the system resources accordingly so as to fulfill the expected demand till a predefined limit.

The initial setting of step 110, and the subsequent processing steps of the method of the invention, allows a further advantage to the operator of the telecommunications system when having to acquire a telecommunications node. For example, a typical pricing parameter for some telecommunications nodes uses to be related to the rate of usage of the node; for example, related to the maximum number of users that can be configured to be served in said node. As those skilled know, in computer-based telecommunications nodes this can be accomplished by a specific software which controls that the rate usage does not exceed the acquired "usage licenses". Thus, when acquiring e.g. a HSS, the price agreement between the operator and the provider of the node can be established depending on the number of users whose subscriber data can be configured in said node and who shall be served for registration information from it. Accordingly, the HSS provider configures the software of the node with specific software controlling that the amount of users to be provided therein does not exceeds the maximum amount agreed with the operator. The number of usage licenses in a HSS controls to certain extent the capacity for a IMS system in terms of number of users that can subscribe therein.

However, in case the telecommunications operator intends to offer services where, for example, wildcarded-PSIs intervene, said pricing scheme fails, since the amount of users can become unpredictable. The initial setting of step 110 (e.g. configured in the software of the concerned node/s) allows the settlement of a fair and trustable price between a telecommunications operator and the node provider, which can then pre-configure the node with a usage limit data consistent to said price.

In step 115, usage counter(s) stored in relationship with the first identifier is(are) reset. These data (UD) will be updated according to service requests comprising a second identifier belonging to said collection and allowed to proceed, as will be detailed with reference to further steps illustrated in FIG. 1. For example, in step 135 a service request SRV comprising a second identifier belonging to the first identifier is received. The determination on that a received second identifier belongs to a collection identified by a first identifier (step not shown) depends on the nature of these identifiers. For example, in case of Wildcarded PSIs the comparison can be accomplished by matching an identifier received in the message with the portion outside the standardized delimiter expressions "!" of stored Wildcarded PSIs. Other kind of first identifier can also be envisaged having, for example, no relationship with the format/content of the related second identifiers, which can require other procedures for determining a dependency relationship between them.

It is to be noticed here that the service request SRV received in step 135 can comprise identifiers of one or more users, which can be also identifiers associated to services served by specific application servers. Any of these identifiers are susceptible of belonging to a collection identified by a further (first) identifier. For example, if the service request is a SIP message INVITE, either or both: the received identifier of the originating (calling) party (i.e. user, application service, etc), or the received identifier of the terminating (called) party, can be a PSI belonging to a certain wildcarded-PSI, which makes processing the service request INVITE according to the invention.

The execution flow illustrated in FIG. 1 assumes that the service request SRV comprises at least one (second) identifier that belongs to the collection identified by a further (first) identifier. The execution then proceeds to step 140, wherein the current usage data (UD) stored in relationship with the first identifier is checked against the usage limit data (ULD) set for it. If the current usage data exceeds the limit set by the usage limit data the execution of the services proceeds to step 150 where it is rejected, otherwise it proceeds to step 145 wherein the processing of the service request SRV is allowed to continue (CNU). In the latest case, before, during or after the processing of the service, the usage data (UD) stored in relationship with the first identifier are increased accordingly in step 120, as illustrated by arrows A and B.

In step 155 an event (EOS) indicating the end of the service SRV takes place. Following the example case above, in step 155 can be received a SIP BYE message requesting to end up with the communication established with the INVITE received on step 135. In addition to the corresponding (e.g. standardized) procedures for processing the event of step 155, the method proceeds to step 125, as illustrated by arrows Y and Z, wherein the usage data (UD) stored in relationship with the first identifier are decreased accordingly.

The updating steps 120 and 125 can be driven by service events which imply usage of any service provided to a user and/or application using an (second) identifier belonging to the collection of a given (first) identifier. The service in question does not necessarily implies the establishment of a communication as in the exemplary case cited above, wherein the calling, or called, user is identified by a second identifier. For example, in systems providing dynamic registration capabilities (such as IMS), registration events related to second identifiers belonging to a given first identifier can drive also updating of the concerned usage data in steps 120 (e.g. at registration of a given second identifier) and 125 (e.g. at de-registration of said second identifier); which can advantageously be used to limit the number of active registrations for certain group(s) of users.

The usage limit data (ULD) stored in relationship with a first identifier are not necessarily static. If appropriate, ULD stored in relationship with one or more first identifiers can be modified depending on dynamic factors, such as traffic load conditions in one or more nodes of the telecommunications system. This is illustrated by step 130, triggered by a traffic load event(s) TRAFF, which, depending on its nature, can increase or decrease usage limit data ULD stored in relationship with one or more first identifiers. Depending on different embodiments, traffic condition events can be collected and monitored internally by a node of the system intervening in service requests, and/or received in said node from another node in the system. For example, a node can monitor whether its traffic load exceeds and/or goes below predefined values, and then, update concerned ULD (e.g. if stored internally) and/or notify this event to other cooperating nodes in the system.

Step 130 can run in one or more nodes of a telecommunications system, so as to increase or decrease the usage limit data ULD stored in relationship with a first identifier. For example, a HSS can increase/decrease to a certain margin the ULD stored in relationship with one or more first identifiers depending on the signaling or processing rate it is executing. Alternatively, or additionally, the HSS can notify said rate, or a request to increase/decrease to a concerned S-CSCF. A similar procedure can be run in a S-CSCF with regard to a HSS.

The usage limit data ULD related to a first identifier, as well as the range it could oscillate (e.g. depending on dynamic load factors, as illustrated in step 130), can be established according to a predefined fixed fee agreed in advance between the operator owning the telecommunications system and a service provider benefiting of using second identifiers belonging to the collection identified by the first identifier. Therefore, a processing as described above with reference to FIG. 1 allows the settlement of simplified pricing schemes between these parties and, at the same time, allows dispense with implementation and use of complex accounting functions and systems within the premises of the telecommunications operator, and/or within the premises of the service provider.

The internal simplified structure of an apparatus for processing service requests according to the invention shall now be described with reference to FIG. 2 considering a possible implementation as a computer-based apparatus which, as in most of the modern telecommunications systems, is a preferred implementation for telecommunications nodes.

For the sake of clarity, the description of this and subsequent embodiments shall be made considering that the apparatus implements a Home Subscriber Server HSS (20-A), or a Serving Call Session Control Function S-CSCF (20-B), in a telecommunications system comprising a IP Multimedia Subsystem IMS, having to process—among others—service requests comprising identifiers that are Distinct Public Service Identifiers belonging to Wildcarded Public Service Identifiers. It is to be noticed that, according to the 3GPP standardized definition, a HSS comprises, among other functions, the functionality of a Home Location Register HLR with the necessary functionality to attend service requests in a IMS system. Given that the—say—generic functionality of a HSS (or a HLR) e.g. as "location registration" node, and the one of a S-CSCF e.g. as "routing node" assigned to serve signaling related to a set of user identifiers), the skilled person would readily realize how to adapt the invention to other kind of telecommunications systems from the description given herein with reference to a IMS system.

A telecommunications node which serves or mediates in the services provided by or through a telecommunications system (such as a CSCF, a HSS, etc.), regardless its specific construction details, may be considered as an apparatus comprising of one or more functional modules; each of them arranged to perform a specific (sub)function of the total functionality implemented by said node and, eventually, arranged to cooperate with some of the others. Furthermore, in some implementations, the functionality of a given node may be distributed across various physical machines; each performing a part of the total functionality said node is assigned to perform. Once the functionality of a node in a telecommunications system has been defined (e.g. by a telecommunications standard, or some other document), the construction of the functional modules to build up a realization of the corresponding physical machine(s) is a matter of routine work for those skilled in the art. In particular, a HSS or a CSCF implemented as a computer-based apparatus comprises software and hardware, which can be located within a physical machine, or distributed along various cooperating physical machines. The software comprise one or more computer programs (computer readable program code) that, when executed by a computer-based apparatus makes it to behave according to a predefined manner, as determined by the specific program instructions in said programs, which is in accordance to the specific functionality of the telecommunications node it implements.

Figure 2:
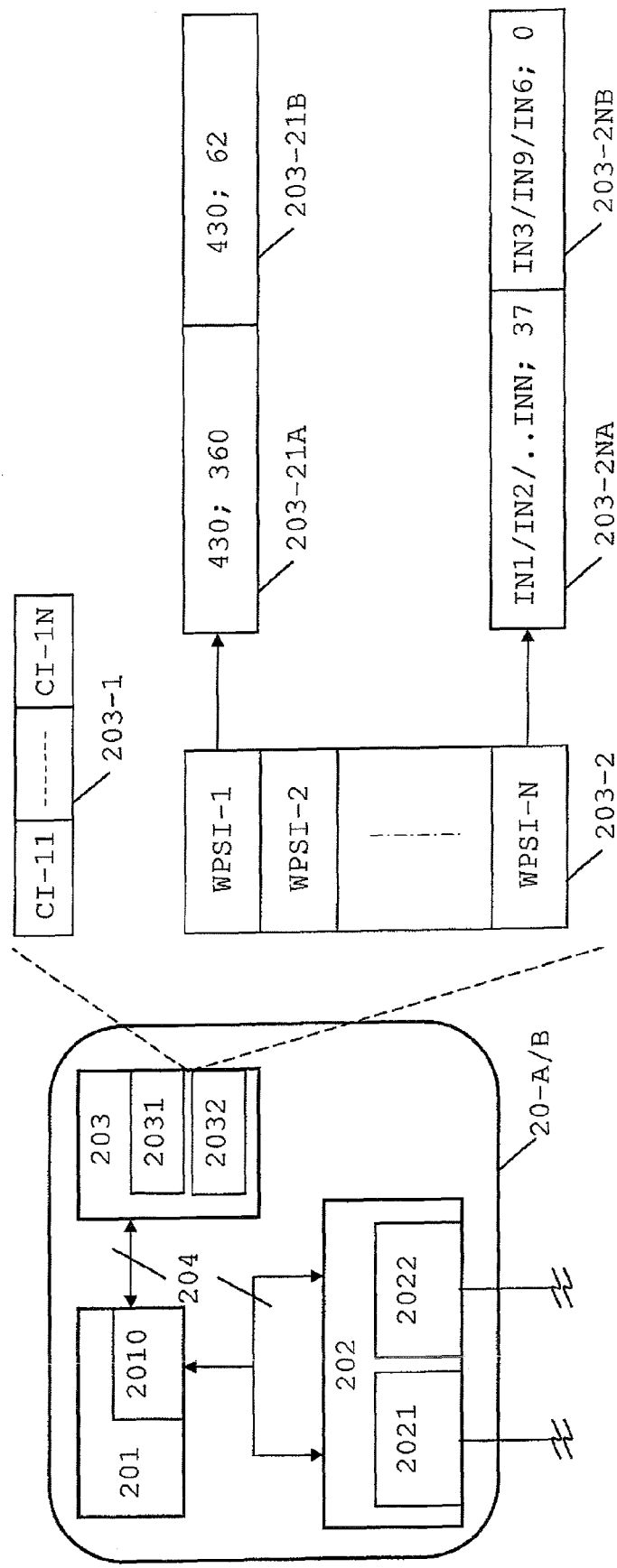
FIG. 2 shows a schematic representation of some functional modules of an apparatus according to one embodiment of the invention.

Accordingly, the explanation given with reference to FIG. 2 shall describe some functional components of a HSS or a S-CSCF, modified so as to accomplish with embodiments of the invention, without falling into specific construction details concerning the possible physical realizations, which are well known by those skilled and, consequently, which are not needed to understand the invention.

The simplified internal structure shown in FIG. 2 comprises: a processing module 201, a communications module 202, a data storage module 203 and internal communication bus 204 which allow data communication and cooperation between them. In general, when a message related to a service is to be sent, the processing module 201 requests the communications module 202 to send the message and provides it with the necessary data, and, when a message related to a service is received by the communications module, it transfers the relevant content to the processing module for triggering the necessary processing. In turn, the processing module 201 accesses the data storage module 203 to update/check/obtain the necessary data for the operation.

The processing module 201 can comprise one or more processors (only one processor 2010 is shown in FIG. 2) which, for example, can be arranged to work in load-sharing or active-backup mode.

The operation in the HSS 20-A or in the S-CSCF 20-B is controlled by computer-readable program code 203-1 comprising instructions (CI-11 . . . , CI-1N) that are executed by processor 2010. The execution of the corresponding program code makes, for example, processor 2010 in the HSS to process a received "User Location Query" (e.g. received as a DIAMETER message "Location-Info-Request", LIR), so as to send reply comprising an identifier of the S-CSCF assigned to serve service related signaling for the concerned user (e.g. sent as a DIAMETER message "Location-Info-Answer", LIA). Similarly, the execution of the corresponding program code makes, for example, processor 2010 of a S-CSCF 20-B to receive a SIP message INVITE and forward it towards a subsequent node towards its destination (e.g. a further CSCF, an application server, etc). In summary, the execution of the corresponding specific program code 203-1 makes the HSS or the S-CSCF to perform according to its standardized functions, which are improved according to embodiments of the invention described herein.

External communications are performed via communications module 202, illustrated in FIG. 2 as comprising two communication devices 2021 and 2022. Depending on implementation alternatives, some of the communication devices can be devoted to a specific kind of communication (e.g.: only with some other kind of node with which a standardized or proprietary signaling interface is used, only for a given type of communication protocol, etc). Also, depending on implementation details, some of the communication devices may be suited to handle any kind of the communication that may be carried out by a HSS or by a S-CSCF according to more than one communication protocol. For example, "DIAMETER" protocol (IETF RFC3588, September 2003) can be used between a S-CSCF (e.g. routing node 120) and a HSS (e.g. location registration node 130) to convey, among other, messages notifying or requesting information of users. This communication protocol (as well as other protocols) can be easily extended for allowing conveyance of new or modified contents, so as to accomplish with invention, as will be later described.

Data storage module 203 stores the data needed for the operation of a S-CSCF 20-B or of a HSS 20-A. A data storage module in a computer-based telecommunications node can comprise one or more data storage devices. In the example illustrated in FIG. 2 it comprises storage devices 2031 and 2032. Memory chips and magnetic or optical discs are example of data storage devices. Depending on criteria such as data access speed for certain data, storage reliability, etc, the storage module of a telecommunications node can comprise one or more storage devices of the same or different kind. Obviously, depending on the kind of node, e.g. if a HSS or a S-CSCF, the content of the data stored in the storage module 203 can vary. FIG. 2 illustrates only some data that can be stored, either or both: in a HSS 20-A, and/or in a S-CSCF 20-B, so as to accomplish with embodiments of the invention.

Reference 203-2 represents a list of Wildcarded-PSIs (WPSI-1 . . . WPSI-N). The list 203-2, as well as some related data, can be provisioned in the node (20-A or 20-B) by operation and maintenance procedures, or received from another cooperating node in the telecommunications system. For example, if the list 203-2 and further related data are kept in a HSS (or in a Subscription Locator Function SLF, as will be later described), the list of Wildcarded-PSIs and some related data can be provisioned therein by operation and maintenance procedures, or received via the so-called "Sh" interface e.g. from an application server. In the case of a S-CSCF, a Wildcarded-PSI and some of its related data can also be provisioned by operation and maintenance procedures, and/or be received from a HSS, e.g., via the so-called "Cx" interface, as a part of the service profile related to a Wildcarded-PSI, which belonging (distinct) PSIs are assigned to be served through said S-CSCF.

The type of content of usage limit data and updated usage data stored in relationship with a particular Wildcarded-PSI can vary depending on different embodiments, and needs not to be the same for all the Wildcarded-PSIs held by a HSS 20-A or a S-CSCF 20-B. This is particularly advantageous if the Wildcarded-PSIs are used in a IMS system to handle services for users identified with Distinct PSIs belonging to these Wildcarded-PSIs. As mentioned before, these users can be primarily subscribers of third party service providers who sign connection agreements with the IMS operator, wherein some of their specific characteristics in terms of traffic demand per service provider, and/or set of users, can not be asserted in advance to the same degree of certainty.

In the illustrated case, the usage limit data (203-21A) stored in relationship with Wildcarded-PSI WPSI-1 states a maximum number of 430 Distinct-PSIs that are allowed to belong to WPSI-1. This first example case illustrates a situation in which the cooperating service provider to which the Wildcarded-PSI WPSI-1 is assigned is uncertain about the particular Distinct-PSIs that, belonging to WPSI-1, will be finally used (e.g. due to its users will be free to made said assignation, or due to any other reason). As opposed, for Wildcarded-PSI WPSI-N (that can be assigned to the same or to another service provider) there is not such an uncertainty, and its related usage limit data (203-2NA) comprise an exhaustive list (IN1/IN2/ . . . INN) of allowed Distinct-PSIs belonging to Wildcarded-PSI WPSI-N.

In addition to, or instead of, the list and/or number of allowed Distinct-PSIs belonging to a particular Wildcarded-PSI, the related usage limit data can comprise data stating the maximum number of simultaneous communications established using Distinct-PSIs belonging to said Wildcarded-PSI. In the example illustrated by FIG. 2, WPSI-1 is assigned to a limit of 360, and WPSI-N to a limit of 37. This allows a simplified usage rate control at the IMS, while provides freedom of Distinct-PSI assignation and use to the third party service provider, or user. The term "communication" is used herein to refer to a telecommunications service which requires at least a temporary connection between two parties, such as a multimedia session starting with a SIP message INVITE and ending with a SIP message BYE.

The example illustrated in FIG. 2 considers that Distinct-PSIs belonging to Wildcarded-PSIs WPSI-1 and WPSI-N have been involved in service requests (e.g. identifying an originating and/or terminating party of the service), and that the corresponding usage data (203-21B, 203-2NB) have been updated accordingly. For example, the limit (430) of different Distinct-PSIs belonging to Wildcarded-PSI WPSI-1 has been reached; which means that a subsequent service request comprising a further Distinct-PSIs belonging to the series of WPSI-1 which has not been received before, shall be rejected. To accomplish with this, the storage 203 can comprise a list of Distinct-PSIs belonging to the series of WPSI-1 that have been received in service requests (not shown in FIG. 2). However, since the limit of maximum simultaneous communications for WPSI-1 (360) has not been reached yet (62 is illustrated), further service requests can be accepted if—according to the illustrated example—the Distinct-PSIs they comprise have been received before. On the other hand, for Wildcarded-PSI WPSI-N, only 3 allowed Distinct-PSIs have been received so far in service requests: IN3, IN9 and IN6; while there are currently no communications established with any of these Distinct-PSIs. This means that, for example, a SIP message INVITE comprising Distinct-PSI "IN5" (assumed to belong to WPSI-N series) will be allowed to proceed.

Both, a HSS and a S-CSCF, store a set of data (called "service profile") which are needed for processing service requests related to users of a IMS system. In short, a S-CSCF downloads the service profile related to an identifier of a user from a HSS, which acts as the master storage. As mentioned earlier, in the particular case of Wildcarded-PSIs, there is no a specific ("distinct") service profile for the eventual Distinct-PSI belonging to them, but a —say—"generic" service profile associated to each Wildcarded-PSI. Although service profile data related to Wildcarded-PSIs held by a HSS 20-A, or a S-CSCF 20-B, are not shown in FIG. 2, some of the illustrated data can advantageously be kept stored in relationship with the corresponding profile; which allows a easy download from a HSS to a S-CSCF, since the existing signaling (i.e. through the "Cx" interface) can be used to convey the necessary new data.

In summary, the maximum number of simultaneous sessions supported for a specific Wildcarded-PSI, and/or the maximum number of Distinct-PSIs belonging to it, or its list, can be configured in HSS as a part of the service profile of the Wildcarded-PSI, and later enforced by the S-CSCF, thereby avoiding unpredictable usage of Wildcarded-PSI range that might imply overload in the system resources.

Although the apparatus of FIG. 2, and some of its storage data, has been described with reference to a HSS 20-A, or to a S-CSCF 20-B, it could also represent a SLF node, suited to provide HSS information in a IMS system, and modified to accomplish with an embodiment of the invention.

In short, when a IMS system comprises more than one HSS, a SLF can intercept service requests sent from other system nodes, which are queries primarily addressed to the HSS, and gives back the corresponding HSS identifier. The querying node then uses said identifier to redirect the original query to the particular HSS that stores the necessary data to process it. In a IMS system signaling related to service requests exchanged with SLFs and HSSs is commonly conveyed in DIAMETER messages, and it is used, among other, to accomplish with registration and deregistration events, data profile update, service profile download and updating, updating of server assignment information, etc.

The invention provides an embodiment in which a SLF is adapted to further process service requests comprising identifiers that belong to the collections identified by Wildcarded-PSIs. In this embodiment, the SLF can store usage limit data (203-21A, 203-2NA) and usage data (203-21B, 203-2NB) of a plurality of Wildcarded-PSIs (WPSI-1 . . . WPSI-N), which can be updated according to signaling related to service requests that it intercepts in a similar manner as described above in relationship with a HSS. This embodiment thus provides a simplified solution which can help to control the traffic due to Wildcarded-PSI usage by controlling the maximum number of Distinct-PSIs, or the allowed ones, not in a plurality of HSSs in a IMS system, but in a—usually centralized—point, such as a SLF node.

Figure 3:
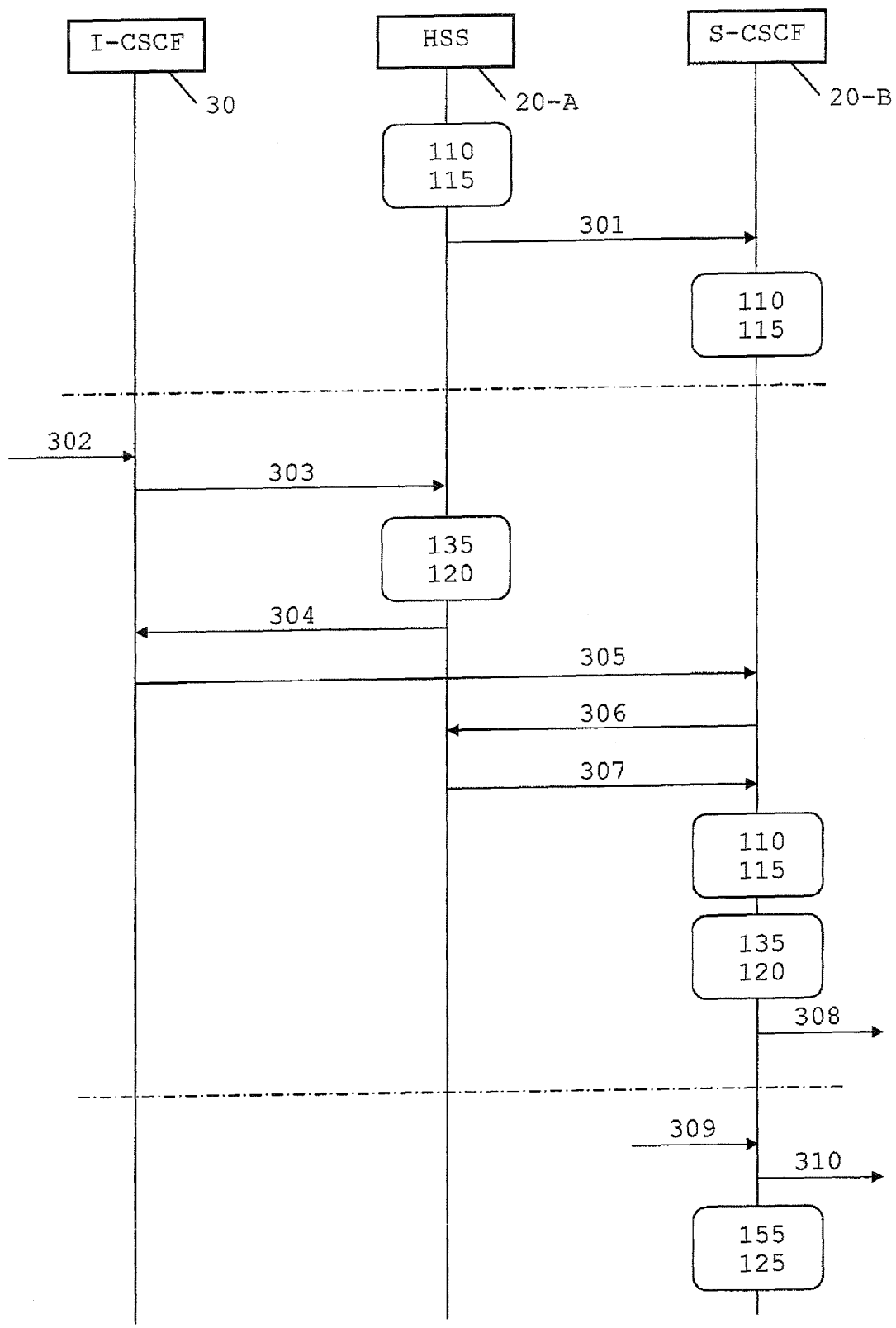
FIG. 3 shows a simplified signaling flow illustrating some of the steps of FIG. 1 according different embodiments of the invention.

The signaling shown in FIG. 3 illustrates some of the steps described above with reference to FIG. 1, executed in a IMS system according to different embodiments.

For example, service profile data for one or more Wildcarded-PSIs are provisioned, or modified, in the HSS 20-A (flows not shown in FIG. 3) via operation and maintenance procedures. Among the received data, it is received the corresponding usage limit data ULD, which are stored in step 110, as described in FIG. 1, preferably as one more data of the service profile of the newly defined, or updated, Wildcarded-PSI(s). In case of newly defined Wildcarded-PSI, the HSS can run step 115 so as to reset updated usage data UD related to it. This step is optional if the control of service requests is going to be enforced only in S-CSCFs according to one embodiment of the invention, as will be later described. Steps 110 and 115 as described above can also be run by a SLF, if said SLF is going to be the enforcing point to control service requests, according to one embodiment of the invention.

According to the illustrated embodiment, the HSS sends in flow 301 a DIAMETER message "Push Profile Request" PPR to the S-CFCF which is assigned to serve signaling related to users identified by Distinct-PSIs belonging to the collection of an updated, or newly defined, Wildcarded-PSI (20-B). The PPR message comprises the new or updated service profile which, according to one embodiment of the invention, can comprise the usage limit data ULD that will apply for said Wildcarded-PSI. This can be accomplished by adding a new data type (e.g. an integer for maximum number of simultaneous service sessions or maximum number of Distinct-PSIs, and/or a list of the SIP-URIs of the allowed Distinct-PSIs of the range, etc) to the schema of DIAMETER message PPR, as this protocol is easily extendable. S-CFCF 20-B then stores the updated, or newly defined, profile data of the concerned Wildcarded-PSI, comprising its related ULD in step 110, and preferably then resets in step 115 the corresponding current usage data UD if it is a newly defined service profile data. Message PPR is followed by diameter message "Push Profile Answer" PPA from S-CSCF to HSS (not shown in FIG. 3).

The enforcement of the control of service request according to embodiments of the invention (IMS) can be performed in a HSS alone, in a SLF alone, in the S-CSCF assigned to serve signaling related to Distinct-PSIs related to a Wildcarded-PSI, or by a HSS or SLF in cooperation with said S-CSCF. The example of FIG. 3 illustrates cooperation cases between a HSS (or a SLF) 20-A and a S-CSCF 20-B.

In order to a clearer understanding of the invention, it can be assumed that, for example, Wildcarded-PSI "sip:pbx7!.*!@example.com" identifies all the individual identifiers of the users of a VPN service operator which connects to IMS and are (some or all) served via S-CSCF 20-B. FIG. 3 illustrates an example case wherein the identifier that triggers the processing according to the invention relates to the user (or service) terminating the service request. However, as explained earlier, said processing can be trigger by any of the identifiers of any party involved in a service request, either, as originating or as terminating party.

In flow 302 a SIP message INVITE is received in the Interrogating-CSCF I-CSCF 30 comprising, as identifier of the terminating party a SIP URI such as: "sip:pbx71234.@example.com", which identifies a user of said service operator. The I-CSCF 30 then follows the standardized IMS procedures and sends in flow 303 a DIAMETER message "Location-Info-Request" LIR towards HSS 20-A so as to obtain an identifier usable to further route the received INVITE towards the corresponding assigned S-CSCF. For the HSS 20-A the reception of the LIR is a service request 135 and, among other, checks the received identifier of the terminating party and determines that S-SCSF 20-B is assigned to further process the service related signaling.

If enforcement of the control of service request is performed partially or totally by the HSS, then it can proceed as follows.

The HSS can also determine that the received URI "sip:pbx71234.@example.com" belongs to Wildcarded-PSI "sip:pbx7!.*!@example.com" it handle, and then checks some of the usage limit data ULD related to it. For example, it can check whether SIP-URI "sip:pbx71234.@example.com" is allowed in the series of its Wildcarded-PSI. Alternatively, it can check whether said Distinct-PSI have been received before in another service request (e.g. in another LIR message) and, if not, check whether the number of Distinct-PSIs received so far related to said Wildcarded-PSI exceeds a maximum number as determined by the associated ULD (this involves a storage not detailed in FIG. 2, and a storage step not shown in FIGS. 1 or 3). In the latest case, the request 303 can be rejected with a DIAMETER message "Location-Info-Answer" LIA (304) comprising an error result that would cause the I-CSCF 30 to reject back the INVITE. Otherwise, flow 304 can comprise a LIA message conveying an identifier of S-CSCF 20-B. In this case, the HSS 20-A can, for example, update a usage counter of Distinct-PSIs belonging to Wildcarded-PSI "sip:pbx7!.*!@example.com" in the updating step 120 by increasing said counter.

If there were more than one HSS in the IMS system, then a SLF could be present which would then intercept the LIR sent from I-CSCF 30, so as to provide an identifier of the corresponding HSS (e.g. HSS 20-A) to the I-CSCF by using DIAMETER redirection mechanisms. In such a case, instead of performing a (optional) enforcement of the usage of Wildcarded-PSIs in the IMS system in all the HSS that could be involved in said system, the checking(s) and processing described above, including the service rejection if proceeds, could be performed by said SLF (not shown in FIG. 3), which would then need to store the necessary data, e.g., as described with reference to FIG. 2.

Assuming a successful processing in the HLR (or SLF) 20-A, or assuming said HLR (or SLF) does not implement any processing capability specific for accepting/rejecting service requests according to the invention, the INVITE is forwarded in flow 305 from I-CSCF 30 to the assigned S-CSCF 20-B using well-known IMS procedures.

In order to better describe eventual embodiments of the invention, FIG. 3 illustrates the case in which S-CSCF has not received before any service request comprising the SIP-URI "sip:pbx71234.@example.com", nor any other distinct PSI belonging to the collection identified by Wildcarded-PSI "sip:pbx7!.*!@example.com" (e.g. such as "sip:pbx79023.@example.com", "sip:pbx72966.@example.com", etc). This can be also the case wherein the PPR flow 301 (and subsequent steps in the S-CSCF 20-B) did not take place for said Wildcarded-PSI. In these cases the S-CSCF 20-B lacks the service profile data that it needs to further process the INVITE received IN 305. Accordingly, in flow 306 it sends a DIAMETER message "Server-Assignment-Request" SAR to the HSS 20-A comprising, among other data, the received identifier of the terminating party "sip:pbx71234.@example.com".

According to the IMS standardized procedures, the HLR detects that the received identifier matches a Wildcarded-PSI and then sends in flow 307 a DIAMETER message "Server-Assignment-Answer" SAA comprising the matching Wildcarded-PSI ("sip:pbx7!.*!@example.com", in the example case) together with the service profile data stored in relationship to it; thereby avoiding further SAA queries from S-CSCF 20-B for subsequent service requests comprising an identifier belonging to said Wildcarded-PSI. According to the invention, the SAA message further comprises usage limit data ULD related to the Wildcarded-PSI, which, as described earlier with reference to PPR message, is preferably sent from the HSS as a part of the service profile data conveyed in a DIAMETER message SAA; thereby, avoiding the sending of new kind of messages and/or dispensing with the need of configuring by operation and maintenance the S-CSCF(s) that could be involved in service requests comprising identifiers belonging to Wildcarded-PSIs.

The S-CSCF 20-B then stores in step 110 the received usage limit data ULD related to the Wildcarded-PSI "sip:pbx7!.*!@example.com", and resets in step 115 the usage data UD related to said identifier. The usage limit data ULD, and the corresponding UD to be further updated according to service requests, can comprise maximum number and/or list of Distinct-PSIs belonging to the range identified by Wildcarded-PSI "sip:pbx7!.*!@example.com". However, if the related checks for said UD/ULD are to be performed by a HSS, or by a SLF, these data can relate to the maximum number of services which are ongoing and which have been setup with service requests comprising Distinct-PSIs belonging to the range identified by said Wildcarded-PSI.

Alternatively, the ULD held by a S-CSCF in relationship with a Wildcarded-PSI comprises any one of these usage limit data ULD, or any combination thereof, when a greater degree of granularity control is desirable in the S-CSCF. This provides the further advantage of updating any ULD data according to traffic conditions in the S-CSCF, or traffic conditions reported to it from another cooperating node. In this respect, although not mentioned before, an allowed range determining increasing/decreasing limits for the ULD related to a Wildcarded-PSI can be received in the S-CSCF together with the service profile data in PPR or SAA messages.

Regardless of if S-CSCF 20-B had not received before any service request comprising the SIP-URI "sip:pbx71234.@example.com", nor any other distinct PSI belonging to the collection identified by Wildcarded-PSI "sip:pbx7!.*!@example.com", etc; the reception of the INVITE 305 is a service request 135 for the S-CSCF and, among other, it checks whether the received identifier of the terminating party "sip:pbx71234.@example.com" matches a range identified by Wildcarded-PSI "sip:pbx7!.*!@example.com" that it is assigned to serve, and for which it stores the associated ULD and UD.

Since that is the case according to the illustrated example, S-CSCF 20-B then checks the usage limit data ULD related to the matching Wildcarded-PSI. For example, S-CSCF 20-B can check whether SIP-URI "sip:pbx71234.@example.com" is allowed in the series of its corresponding Wildcarded-PSI. Alternatively, S-CSCF 20-B can check whether said Distinct-PSI have been received before in another service request (e.g. in another INVITE message, e.g., as originating or terminating party identifier) and, if not, check whether the number of Distinct-PSIs received so far related to said Wildcarded-PSI exceeds a maximum number as determined by the associated ULD (this involves a storage not detailed in FIG. 2, and a storage step not shown in FIGS. 1 or 3). Alternatively, or additionally, S-CSCF 20-B can check the ongoing sessions that were initiated with its intervention with service requests (e.g. SIP INVITE messages) comprising Distinct-PSIs belonging to the matching Wildcarded-PSI "sip:pbx7!.*!@example.com" and which are still alive (this also involves a storage not detailed in FIG. 2, and a storage step not shown in FIGS. 1 or 3). If the check of the ULD versus the corresponding UD is not passed, the INVITE would be rejected back from the S-CSCF 20-B. Otherwise, it is allowed to proceed towards its final destination (flow 308), and the UD associated to the Wildcarded-PSI "sip:pbx7!.*!@example.com" is increased accordingly in step 120.

Later, a SIP request BYE received in flow 309 by S-CSCF 20-B which indicates that the communication established with the SIP INVITE of 302, 305 and 308, is ended. In the illustrated case the message is received from the initiating party; therefore, the S-CSCF 20-B forwards it towards the terminating party in flow 310, and processes in 155 an end of the service. If, according to one embodiment described above, S-CSCF 20-B keeps updated the number of ongoing communications established with service requests comprising Distinct-PSIs belonging to Wildcarded-PSI "sip:pbx7!.*!@example.com", together with the release of the resources assigned to the communication established with the INVITE 305, it can update in step 125 the corresponding UD, for example, by decreasing the number of simultaneous communications established with identifiers belonging to the range of Wildcarded-PSI "sip:pbx7!.*!@example.com".

Currently, most of the telecommunications nodes are implemented by computer-based apparatuses. Accordingly, computer programs comprising computer-readable program codes are loaded in computer-based nodes of telecommunications systems causing them to behave according to a predefined manner, as determined by the respective program codes, which are in accordance to the specific functionality specified for the telecommunications nodes these apparatuses implement. Thus, those skilled in creating and/or modifying computer programs, would, without departing of the teachings of the present invention, readily apply them to create and/or modify computer programs suitable to be loaded in a computer-based telecommunications node involved in processing service requests, so as to make it to behave according to any of the described embodiments.

The invention has been described with respect to some exemplary embodiments in an illustrative and non-restrictive manner. Variations can be readily apparent to those of ordinary skill in the art. For this reason, the invention is to be interpreted and limited in view of the claims.

The invention claimed is:

1. A method for processing service requests in a telecommunications system comprising the steps of:
   a. storing usage limit data in relationship with a first identifier, the first identifier identifying a collection of second identifiers that can be received in a service request;
   b. storing updated usage data in relationship with the first identifier, the updated usage data being updated according to service requests comprising a second identifier belonging to the collection that have been allowed to proceed;
   c. rejecting a service request comprising a second identifier belonging to the collection when current usage data reaches a value established by the usage limit data, or allowing the service request to proceed if current usage data has not reached the value established by the usage limit data; and,
   d. dynamically updating the usage limit data according to traffic load conditions in an apparatus of the telecommunications system;
   wherein the usage limit data states, either or both:
      a maximum number of simultaneous communications; and,
      a maximum number of second identifiers belonging to the collection; and,
   wherein the step b comprises at least one step selected from:
      b1. storing data about a number of simultaneous communications related to the first identifier, the number being updated according to current communications established with service requests for establishing communications and comprising a second identifier belonging to the collection and allowed to proceed; and,
      b2. storing data about the number of second identifiers belonging to the collection that have been received in service requests.

2. The method of claim 1, wherein the telecommunications system comprises a Internet Protocol Multimedia Subsystem having a Home Subscriber Server and a Serving Call Session Control Function, wherein the first identifier is a Wildcarded Public Service Identifier, and wherein the second identifiers are Distinct Public Service Identifiers belonging to the Wildcarded Public Service Identifier.

3. The method of claim 2, wherein the Wildcarded Public Service Identifier identifies a group of users of a private exchange connected to the Internet Protocol Multimedia Subsystem.

4. The method of claim 2, wherein the Internet Protocol Multimedia Subsystem further comprises a Subscription Locator Function, and wherein the step a. comprises at least one step selected from:
   a1. storing usage limit data in the Home Subscriber Server, and
   a2. storing usage limit data in the Subscription Locator Function.

5. The method of claim 4, wherein the step b. further comprises the step of:
   b3. storing in the Home Subscriber Server, or in the Subscription Locator Function, data about the Distinct Public Service Identifiers belonging to the Wildcarded Public Service Identifier that have been received in the Home Subscriber Server, or in the Subscription Locator Function, in User Location Queries;
and wherein step c. further comprises the steps of:
   c1. receiving in the Home Subscriber Server, or in the Subscription Locator Function, a User Location Query comprising a Distinct Public Service Identifier belonging to the Wildcarded Public Service Identifier; and,
   c2. sending a negative result to the User Location Query when a number of Distinct Public Service Identifiers belonging to the Wildcarded Public Service Identifier exceeds a value stated in the usage limit data, or a positive result to the User Location Query when the number of Distinct Public Service Identifiers belonging to the Wildcarded Public Service Identifier does not exceed the value stated in the usage limit data.

6. The method of claim 4, wherein the step a. further comprises the step of:
   a1. storing usage limit data in the Home Subscriber Server as a part of a service profile related to the Wildcarded Public Service Identifier, further comprising the step of:
   e. downloading from the Home Subscriber Server to the Serving Call Session Control Function the service profile related to the Wildcarded Public Service Identifier comprising at least part of the usage limit data, wherein the step a. comprises the step of:
   a3. storing usage limit data in the Serving Call Session Control Function as a part of the service profile related to the Wildcarded Public Service Identifier.

7. The method of claim 2, wherein the step b. comprises the step of:
   b3. storing data about the Distinct Public Service Identifiers belonging to the Wildcarded Public Service Identifier that have been received in the Serving Call Session Control Function in service requests for establishing communications, and wherein the step c. further comprises the steps of:
   c1. receiving in the Serving Call Session Control Function a service request for establishing a communication comprising a Distinct Public Service Identifier belonging to the Wildcarded Public Service Identifier; and,
   c2. sending a negative result to the service request when a number of Distinct Public Service Identifiers belonging to the Wildcarded Public Service Identifier exceeds a value stated in the usage limit data, or a positive result to the service request when the number of Distinct Public Service Identifiers belonging to the Wildcarded Public Service Identifier does not exceed the value stated in the usage limit data.

8. The method of claim 2, wherein step b. comprises the step of:
   b3. storing data about a number of current communications established through the Serving Call Session Control Function with service requests for establishing communications comprising Distinct Public Service Identifiers belonging to the Wildcarded Public Service Identifier, and wherein the step c. comprises the steps of:
   c1. receiving in the Serving Call Session Control Function a service request for establishing a communication comprising a Distinct Public Service Identifier belonging to the Wildcarded Public Service Identifier and,
   c2. sending a negative result to the service request when the number of current communications exceeds a value stated in the usage limit data, or a positive result to the service request when the number of current communications does not exceed the value stated in the usage limit data.

9. An apparatus for processing service requests in a telecommunications system, comprising a processor and a storage device in communication with the processor and storing instructions adapted to be executed by the processor to:
   store usage limit data in relationship with a first identifier, the first identifier identifying a collection of second identifiers that can be received in a service request,
   store updated usage data in relationship with the first identifier, the updated usage data being updated according to service requests comprising a second identifier belonging to the collection that have been allowed to proceed;
   reject a service request comprising a second identifier belonging to the collection when current usage data reaches a value established by the usage limit data, or allowing the service request to proceed when current usage data has not reached the value established by the usage limit data; and,
   dynamically update the usage limit data according to traffic load conditions in a node of the telecommunications system;
   wherein the usage limit data states, either or both:
      a maximum number of simultaneous communications; and,
      a maximum number of second identifiers belonging to the collection and,
   wherein the storage device further stores instructions adapted to be executed by the processor to:
      store data about a number of simultaneous communications related to the first identifier, the number being updated according to current communications established with service requests for establishing communications and comprising a second identifier belonging to the collection that have been allowed to proceed; and/or,
      store data about the number of second identifiers belonging to the collection that have been received in service requests.

10. The apparatus of claim 9, wherein the telecommunications system comprises an Internet Protocol Multimedia Subsystem, wherein the first identifier is a Wildcarded Public Service Identifier, and wherein the second identifiers are Distinct Public Service Identifiers belonging to the Wildcarded Public Service Identifier.

11. The apparatus of claim 10, wherein the Wildcarded Public Service Identifier identifies a group of users of a private exchange connected to the Internet Protocol Multimedia Subsystem.

12. The apparatus of claim 11, wherein the storage device further stores instructions adapted to be executed by the processor to perform as a Home Subscriber Server or as a Subscription Locator Function, and wherein the usage limit data are stored in the Home Subscriber Server, or in the Subscription Locator Function.

13. The apparatus of claim 10, wherein the storage device further stores instructions adapted to be executed by the processor to:
   store, as usage limit data, data about the Distinct Public Service Identifiers belonging to the Wildcarded Public Service Identifier that have been received in User Location Queries;
   receive a User Location Query comprising a Distinct Public Service Identifier belonging to the Wildcarded Public Service Identifier; and,
   send a negative result to the User Location Query when a number of Distinct Public Service Identifiers belonging to the Wildcarded Public Service Identifier exceeds a value stated in the usage limit data, or a positive result when the number of Distinct Public Service Identifiers belonging to the Wildcarded Public Service Identifier does not exceed a value stated in the usage limit data.

14. The apparatus of claim 10, wherein the storage device further stores instructions adapted to be executed by the processor to download to a Serving Call Session Control Function a service profile related to a Wildcarded Public Service Identifier comprising at least part of the usage limit data.

15. The apparatus of claim 10, wherein the storage device further stores instructions adapted to be executed by the processor to perform as a Serving Call Session Control Function, and wherein the storage device further stores instructions adapted to be executed by the processor to:

store, as usage limit data, data about the Distinct Public Service Identifiers belonging to the Wildcarded Public Service Identifier that have been received in the Serving Call Session Control Function in service requests for establishing communications;

receive a service request for establishing a communication comprising a Distinct Public Service Identifier belonging to the Wildcarded Public Service Identifier; and, send a negative result to the service request when a number of Distinct Public Service Identifiers belonging to the Wildcarded Public Service Identifier exceeds a value stated in the usage limit data, or a positive result when the number of Distinct Public Service Identifiers belonging to the Wildcarded Public Service Identifier does not exceed the value stated in the usage limit data.

16. The apparatus of claim 10, wherein the storage device further stores instructions adapted to be executed by the processor to perform as a Serving Call Session Control Function, and wherein the storage device further stores instructions adapted to be executed by the processor to:

store, as usage limit data, data about a number of current communications established through the Serving Call Session Control Function with service requests for establishing communications comprising Distinct Public Service Identifiers belonging to the Wildcarded Public Service Identifier;

receive a service request for establishing a communication comprising a Distinct Public Service Identifier belonging to the Wildcarded Public Service Identifier; and, send a negative result to the service request when the number of current communications exceeds a value stated in the usage limit data, or a positive result when the number of current communications does not exceed the value stated in the usage limit data.

17. The apparatus of claim 14, wherein the storage device further stores instructions adapted to be executed by the processor to:

receive from a Home Subscriber Server the service profile related to a Wildcarded Public Service Identifier comprising at least part of the usage limit data.

18. A computer program embodied on a non-transitory computer readable medium for configuring a computer processor for processing service requests in a telecommunications system, comprising:

a computer-readable program code for storing usage limit data in relationship with a first identifier, the first identifier identifying a collection of second identifiers that can be received in a service request, a computer-readable program code for storing updated usage data in relationship with the first identifier, the updated usage data being updated according to service requests comprising a second identifier belonging to the collection that have been allowed to proceed;

a computer-readable program code for rejecting a service request comprising a second identifier belonging to the collection when current usage data reaches a value established by the usage limit data, or allowing the service request to proceed when current usage data has not reached the value established by the usage limit data; and, a computer-readable program code for dynamically updating the usage limit data according to traffic load conditions in an apparatus of the telecommunications system;

wherein the usage limit data states, either or both:
   a maximum number of simultaneous communications; and,
   a maximum number of second identifiers belonging to the collection; and wherein the computer program further comprises:
   a computer-readable program code for storing data about a number of simultaneous communications related to the first identifier, the number being updated according to current communications established with service requests for establishing communications and comprising a second identifier belonging to the collection and allowed to proceed and/or,
   a computer-readable program code for storing data about the number of second identifiers belonging to the collection that have been received in service requests.

* * * * *